Figure 1:
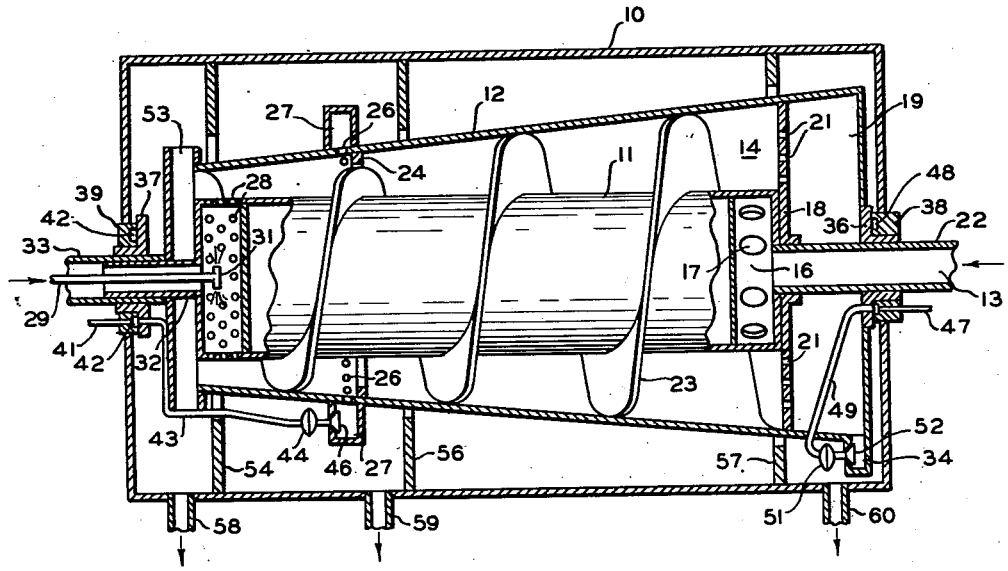

June 11, 1957 — J. A. McBRIDE — 2,795,635
CENTRIFUGE
Filed Aug. 28, 1953 — 2 Sheets-Sheet 1

INVENTOR.
J. A. McBRIDE
BY Hudson and Young
ATTORNEYS

June 11, 1957  J. A. McBRIDE  2,795,635
CENTRIFUGE
Filed Aug. 28, 1953  2 Sheets-Sheet 2

INVENTOR.
J. A. McBRIDE
BY Hudson and Young
ATTORNEYS

United States Patent Office 2,795,635
Patented June 11, 1957

2,795,635

CENTRIFUGE

John A. McBride, Waco, Tex., assignor to Phillips Petroleum Company, a corporation of Delaware Application August 28, 1953, Serial No. 377,215

6 Claims. (Cl. 260—674)

This invention relates to a centrifuge. In a further aspect, this invention relates to a centrifuge provided with means for countercurrently washing solid material in the centrifuge. In a further aspect, this invention relates to a centrifuge comprising inner and outer drums, means for moving solid material through the space between these drums, means for countercurrently washing solid material in one end of said centrifuge and means for removing the products separated by the centrifuge. In a further aspect, this invention relates to the use of my centrifuge in a process for the production of xylenes from a hydrocarbon stream. In a further aspect, this invention relates to a method for the separation and recovery, in a purified condition, of para-xylene produced by isomerization of a naphthene stream in a hydroforming zone.

At the present time many new chemical products are becoming of increased importance. In each case it is important that these chemicals be obtained in as pure a state as possible for further processing in order to prevent contamination of products which are prepared from these chemicals. With some of these materials distillation and fractionation are suitable for their separation. Other materials are separated by means of crystallization where distillation is impracticable or impossible. Crystallization is important when dealing with materials which are thermally unstable, and, in general, mixtures of materials which boil at or near the same temperature and which can be separated on the basis of their melting points.

Some materials can be purified to the desired degree by a single crystallization, but in most instances, fractional crystallization is required. In conventional fractional crystallization, the operation is carried out in a series of batchwise operations. By this method, the material is cooled to a temperature such that a desired material is solidified. This solid material is removed from the mother liquor, remelted, and again crystallized to effect further purification. This process of separating solids from mother liquor, remelting and recrystallizing is continued until material of the desired purity is obtained.

I have invented a centrifuge which makes possible a continuous crystallization process which allows for washing the solid phase with a reflux stream, and removal, if desired, of a liquid stream of intermediate purity, this being the wash liquid, as well as a pure product, and a stream of the mother liquor. I have adapted this centrifuge to a particular process, but it will be understood that many processes, in addition to the specific one described, may be adapted to this centrifuge.

Each of the following objects is obtained by at least one of the aspects of this invention.

An object of this invention is to provide a new centrifuge.

A further object of this invention is to provide a centrifuge which is provided with means for countercurrently washing solid materials therein with pure product, and removing pure product, as a liquid or a solid, and mother liquor.

A further object of this invention is to provide a centrifuge, this centrifuge being provided with means for countercurrently washing solid materials therein, means for removing this wash liquid, this constituting a rich recycle stream, and means for removing a pure product and mother liquor.

A further object of this invention is to provide a process for the production of para-xylene.

A further object of this invention is to provide a process for the production of para-xylene utilizing this centrifuge which enables me to obtain para-xylene of high purity, a rich recycle stream for reintroduction into the separation step, and a mother liquor stream which can be isomerized to produce a further amount of the desired product.

Figure 2:
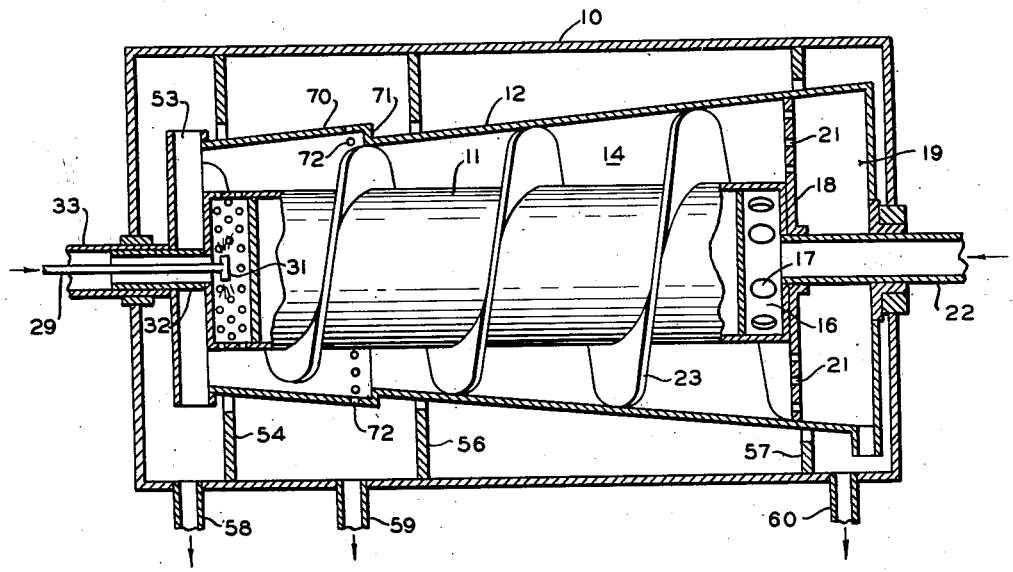
Figure 3:
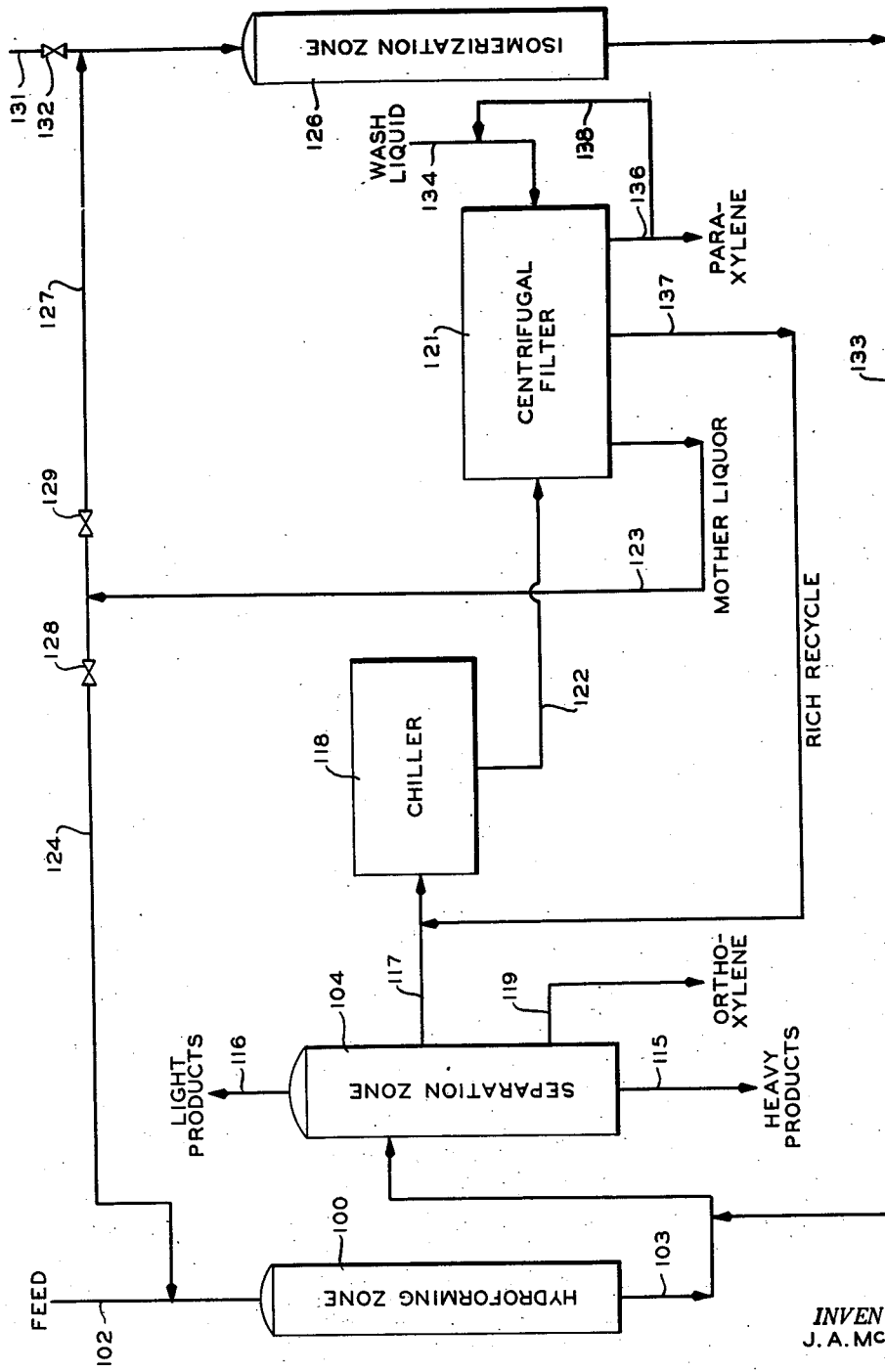

Other objects and advantages of this invention will be apparent to one skilled in the art upon reading the accompanying specification and studying the drawing which forms a part thereof, and comprises Figure 1 which shows, schematically and partly in section, an embodiment of the centrifuge of my invention, Figure 2 which illustrates a modification of the centrifuge of my invention, and Figure 3 which illustrates one process in which the use of my centrifuge is especially applicable.

My invention comprises a centrifuge which is provided with means for countercurrently washing solid material therein. Solid material in the form of a slurry is introduced into one end of the centrifuge and is moved therethrough by means of a suitable conveyor. Wash liquid contacts the solid material at the other end of the centrifuge. At a point downstream of the introduction of the wash liquid, but in the downstream portion of the centrifuge a series of liquid outlets are provided and, surrounding these outlets, there is liquid collection means. The mother liquor appears in the upstream end of the centrifuge and can be removed therefrom. In Figure 1, which is the preferred form of my invention, means are provided for controlling the amount of liquid removed from both the downstream holes and the mother liquor removal conduits. Control of this removal permits variations in the amount of wash liquid removed as a separate stream and it will be evident that if none is removed the wash liquid passes completely through the centrifuge and is removed with the mother liquor.

Referring now to Figure 1, I will give a more complete description of this centrifuge. This apparatus comprises an outer shell 10, with two rotatable members mounted therein, these being an inner drum 11 and an outer drum 12, the outer drum being of a truncated conical shape. Feed material inlet conduit 13 communicates with the upstream portion of the space between drums 11 and 12, this being designated 14, after it passes through zone 16. The end portion of drum 11 is provided with solid material conduits 17. A plate 18, mounted upon drum 12, prevents solid material from flowing into space 19, but is provided wtih liquid conduits 21. Power to rotate drum 11 is applied to shaft 22, but as means for rotating such an element are well known, the drive means are not shown. Mounted upon drum 11 is a conveyor, this comprising helical screw member 23. Mounted upon the inner surface of drum 12 is a dam 24, and, immediately downstream thereof liquid conduits 26 are provided. Surrounding these liquid conduits 26 and mounted on the outer surface of drum 12 there is a chamber 27. At the very downstream end of drum 11 liquid conduits 28 are provided in the drum. Extending to a point in proximity to conduits 28 there is provided wash liquid supply conduit 29 which terminates in a spray type outlet 31. The downstream end of drum 11 terminates in axis or bearing 32, and drum 12 terminates in axle 33, the driving force for drum 12 being applied thereto. Mother liquor removal conduit 34 is provided extending from chamber 19. Means for supplying power to drum 12 is not shown, but this drum, like drum 11, rotates at a high rate of speed. Rotatable bearings 36 and 37 are provided at the ends of the centrifuge, these rotating upon stationary bearings 38 and 39. If desired, the conveyor can be mounted upon drum 12.

I have provided an automatic method of controlling the amount of liquid withdrawn from members 27 and 34, from outside the centrifuge while it is operating. In each case a pressure operated valve is provided which is connected to an outside source of gas under pressure. In connection with chamber 27, the gas pressure is supplied by means of conduit 41, this conduit communicating with annular ring 42 in bearing 39. Conduit 43, communicating with annular ring 42 through rotating bearing 37, is connected to diaphragm valve 44 which operates the valve member 46. For the control of liquid removal from member 34, air pressure is supplied in essentially the same manner through conduit 47, annular ring 48, and conduit 49 to the diaphragm valve 51 which is connected to valve member 52.

Purified material which is removed from the downstream end of space 14 between drums 11 and 12 passes out of the open end of drum 12 and passes through conduit 53. Suitable partitions are provided on outer shell 10 to keep the material removed from the centrifuge in a separated condition. In Figure 1, these are designated as partitions 54, 56, and 57. Extending from the zones defined by these partitions, removal outlets 58, 59 and 60 are provided.

The operation of the centrifuge of Figure 1 is fairly obvious from the drawing but certain possibilities for this operation should be pointed out. The solid material, which can be supplied by any kind of apparatus for forming a slurry of material, such as a scraped surface chiller, for example, passes through conduit 13 to zone 14 between the drums where it is moved toward the downstream end of this zone by helical screw member 23. Centrifuges of this type, can be operated from several hundred to several thousand revolutions per minute and the liquid supplied with the slurry is thrown toward drum 12 and, as is obvious by the vector forces involved, is driven to the uptsream end of zone 14 and passed to zone 19 through liquid conduits 21. Drum 11, upon which is mounted conveyor 23, rotates inside of drum 12 at a slightly higher rotational speed in the same direction of rotation, thus forcing solid material toward the downstream end. Wash liquid, this preferably being a pure stream of the desired product, is introduced as near the downwstream end as is practical, this being through liquid conduits 28 in Figure 1. This wash liquid passes countercurrently to solid material in zone 14 and passes through conduits 26 into member 27. By controlling the amount of liquid removed from member 27, the amount of reflux liquid passing through the entire solid material bed can be controlled. Likewise the amount of mother liquor withdrawn from zone 19 can be controlled by means of valve member 52, thus providing liquid full operation when desired.

In one method of operation valve member 46 can be kept closed and the entire amount of the pure wash liquid removed with the mother liquor at the upstream end of the centrifuge. In this operation it is preferable to operate with the centrifuge liquid full so that the maximum amount of countercurrent flow of liquid and solid material can be obtained. At other times valve members 46 and 52 can be maintained in their fully open position, in which case all of the wash liquid is removed in the downstream end and all of the mother liquor removed in the upstream end of the centrifuge. Of course, intermediate situations are also possible and the amount of wash liquid removed in the downstream end can be varied as desired even while the centrifuge is in operation.

By controlling the temperature of the wash liquid the purified product can be removed as a solid or as a liquid. Of course, for removal as a liquid it is necessary that the centrifuge be maintained liquid full and the wash liquid introduced at a temperature high enough to melt the product. A part of this wash liquid and melted product is the reflux liquid.

The operation of valve members 46 and 52 is the same and the method of operating one of these is sufficient for a full understanding of this method. Gas pressure, supplied through conduit 41, appears in annular ring 42. This pressure appears in conduit 43 which rotates with rotating bearing 37, the end of conduit 43 communicating with annular ring 42. With an increase in pressure in line 41 the diaphragm of valve 44 is depressed and valve member 46 extends into member 27 allowing liquid material to flow past valve member 46. Valve member 46 should be positioned so as to move on an axis parallel to the axis of rotation of drum 12 so that the centrifugal force, as a result of the speed of rotation will not effect the amount of the valve opening at a specific air pressure. If this axis were perpendicular to the axis of rotation of drum 12, increased speed of rotation would tend to cause the valve to open or close depending upon whether it operates into or out of member 27.

Figure 2 illustrates a modification of this invention wherein drum 12 is provided with an offset portion 70. This offset portion 70 is connected to a main portion of drum 12 by means of annular member 71. Downstream of annular member 71, liquid conduits 72 are located. Examination of this figure will show that the annular member 71 corresponds, as far as the operation is concerned, with dam 24 in Figure 1. In operation the apparatus of Figure 2 functions in the same way as that of Figure 1, and liquid collection and outlet control means can be provided as are shown in Figure 1. However, it has been pointed out above that valve members 46 and 52 may be operated in the full open position so that all of the wash liquid is removed through liquid conduits 26 and all of the mother liquor removed through member 34. If the apparatus of Figure 2 is operated as shown, without these liquid control means, the operation would be essentially the same.

In Figure 3 I have shown a process in which the centrifuge of my invention can be used to special advantage, this being a schematic flow diagram for the production of para-xylene. The apparatus components shown include hydroforming zone 100, this being provided with feed conduit 102 and removal conduit 103. In operation, a naphthenic hydrocarbon fraction boiling in the range of 150 to 450° F., preferably 220 to 300° F., is fed through conduit 102 together with hydrogen to the hydroforming zone 100, this containing a hydroforming catalyst. As this catalyst, I prefer to use a hydrogen chloride treated alumina impregnated with between 0.01 and 5 weight percent platinum, preferably 0.1 to 1 weight percent platinum. Another platinum catalyst is platinum on silica-alumina which has previously been hydrated to reduce the surface area to within 10 to 70 square meters per gram. Hydroforming in this zone is carried out in the presence of these catalysts at a temperature in the range from 700° F. to 1000° F., preferably 800° F. to 950° F. A pressure within the range of atmospheric to 1000 p. s. i. g., preferably 200 to 600 p. s. i. g., is utilized to obtain the selective formation of xylenes from the normal xylene formers or C$_8$ naphthenes, and minor amounts of ethylbenzene. Operation is at a liquid hourly space velocity of 0.3 to 10, preferably 0.5 to 6. Hydrogen is used in a hydrogen to hydrocarbon mol ratio of between 0.5:1 to 20:1, preferably 1:1 to 10:1. The product removed from this zone by means of conduit 103 is passed to separation zone 104 wherein the stream is separated by a combination of fractionation and liquid-liquid extraction so as to remove a hydrocarbon portion higher boiling than xylene through conduit 115 and hydrocarbons lower boiling than xylene through conduit 116. A xylene concentrate, with ethylbenzene, when present, is removed through conduit 117 to a slurry forming zone or chiller 118. If desired an ortho-xylene stream may be removed through conduit 119, this isomer being higher boiling than the meta- and para-xylene and ethylbenzene. From the chiller 118 the slurry is conveyed to the centrifugal filter 121 by means of conduit 122. As is apparent from the previous discussion of this centrifuge, three product streams are conveniently removed. The first of these is the mother liquor stream which is removed through conduit 123. This stream may be returned to hydroforming zone 100 by means of conduit 124 or conveyed to a separate isomerization zone 126 by means of conduit 127. Valves 128 and 129 control the flow of this mother liquor through conduits 124 and 127 respectively.

The mother liquor in this process comprises principally meta-xylene and ethylbenzene, and may be conveniently isomerized to yield a mixture of the three xylenes in separate isomerization zone 126 in which I prefer to use a silica-alumina catalyst such as is prepared by the methods described by McKinney in U. S. Patents 2,142,324 and 2,147,985. These catalysts contain a major portion of silica and a minor portion, preferably between about 0.1 and 2 percent, alumina by weight on the dry basis. However, other isomerization catalysts are well known, these including Friedel-Crafts catalysts, nickel supported on acid treated alumina, molybdena on acid treated alumina, and, in general, catalysts comprising a major proportion of aluminum oxide and a minor proportion of the oxides or sulfides of metals of groups IV, V, VI and VIII of the periodic system. If desired, hydrogen can be introduced along with the material to be isomerized through conduit 131, the amount of this addition being controlled by valve 132.

In general the mother liquor is introduced into zone 126 unless the naphthene content of the subject charge stock is abnormally high, in which case overloading of zone 126 results. At this time all or a portion of the mother liquor can be returned to zone 100.

The effluent from isomerization zone 126 is returned to separation zone 104 by means of conduit 133 where this material can again be processed for recovery of the desired material.

Wash liquid, this comprising pure para-xylene in this particular process, is introduced into the downstream end of centrifuge 121 by means of conduit 134. Also recovered from this downstream end is the pure para-xylene product, this material appearing in conduit 136. When the separation is performed with the removal of the wash liquid at an intermediate portion of the filter without taking off the wash liquid with the mother liquor, this wash liquid appears in conduit 137 and is recycled to the inlet of chiller 118. Since the preferred wash liquid is a portion of the desired product this recycled stream is more concentrated than the mother liquor with respect to the desired product.

Of special value is the fact that this filter allows for the removal of separate streams of differing composition and the reintroduction of these streams into the most advantageous point in the complete process, i. e. the mother liquor from which a substantial portion of the para-xylene has been removed is isomerized to give a further amount of para-xylene, and the recycled wash liquid is recrystallized for separation of additional para-xylene in the filter. The recycled wash liquid is not subjected to further isomerization. If it were, part of the para-xylene would be isomerized to meta- and ortho-xylene.

Thus, it is apparent that I have developed a new centrifuge and, as illustrated herein have developed a process in which the centrifuge is particularly useful. It will be apparent that many other separations could be advantageously carried out with the centrifuge and the process should not be unduly limited to the specific details given. Furthermore, it would be obvious to one skilled in the art that the centrifuge could be modified to utilize three separate zones instead of the two I have described above. In such a modification the product could be removed as a liquid through an additional liquid conduit intermediate the ends of the outer drum by melting it in the third zone by a warm supply of the product and the washing step or zone could be an intermediate zone, the liquid recovered therefrom being the recycle wash liquid stream, while the mother liquor would still be removed from the upstream end of the centrifuge.

The invention can be applied to a vast number of organic and inorganic separations. Of principal importance, there may be mentioned separation of systems containing cyclohexane, systems containing normal paraffins, systems containing benzene, and the like. Other organic chemicals that can be mentioned include pyridines, dimethylphthalates, and fatty acids. Applicable inorganic systems include those for the recovery of pure salts, such as ammonium nitrate for example. Another group is the recovery of anhydrous salts from their hydrates.

An important field in which the present invention is applicable, is the production of concentrated food products, consisting principally of the removal of water from these products. Water can be removed from fruit juices such as grape, pineapple, watermelon, apple, and tomato. Vegetable juices can also be dehydrated in this manner.

Also important is the beverage field where transportation costs add greatly to the cost of these materials by the time they are brought to the hands of the consumer. Beverages which may be concentrated by this method include milk, alcoholic beverages such as beer and wine, and coffee and tea.

Finally, there may be mentioned the purification and concentration of pharmaceuticals, these materials also being readily adaptable to treatment in partial solidification or crystallization processes.

As many possible embodiments may be made of this invention without departing from the scope thereof, it is to be understood that all matter herein set forth or shown in the accompanying drawing is to be interpreted as illustrative and not as unduly limiting the invention.

I claim:

1. A process of separating a mixture of material having different melting points comprising forming a slurry of solidifiable components in said mixture and introducing said slurry to a rotating locus of centrifugal force; removing liquid material from the upstream end of said locus; moving solid material toward the downstream end of said locus; removing purified material from the downstream end of said locus; introducing to the downstream end of said locus only, a wash liquid comprising a portion of the solid material recovered from the downstream end of said locus following its melting; withdrawing a rich recycle liquid stream from a point in said locus between the downstream end and the midpoint thereof; and returning this last mentioned stream to said slurry forming step.

2. A process of separating a mixture of materials having different melting points comprising introducing said mixture in the form of a slurry into a rotating locus of centrifugal force; removing liquid material from the upstream end of said locus; moving solid material toward the downstream end of said locus; removing purified material from the downstream end of said locus; introducing, to the downstream end of said locus only, a wash liquid comprising a portion of the solid material recovered from the downstream end of said locus following its melting, said wash liquid passing countercurrently to the solid material in a direction toward the upstream end of said rotating locus of centrifugal force; and withdrawing a liquid stream from a point in said locus between the downstream end and the midpoint thereof and recovering additional solid from said withdrawn stream.

3. A process of separating a mixture of materials having different melting points comprising cooling said mixture to form a slurry thereof; introducing said slurry to a rotating locus of centrifugal force; removing liquid material from the upstream end of said locus; moving solid material toward the downstream end of said locus; removing purified material from the downstream end of said locus; introducing, to the downstream end of said locus only, a wash liquid comprising a portion of the solid material recovered from the downstream end of said locus following its melting; withdrawing a rich recycle liquid stream from a point in said locus between the downstream end and the midpoint thereof; and returning this last mentioned stream to said cooling step.

4. The process of producing para-xylene which comprises introducing a naphtha boiling in the range between 220° F. and 300° F. into a hydroforming zone; separating a xylene concentrate from the effluent resulting from said zone; cooling said xylenes to a temperature of between —70° F. and —115° F. in a chiller; introducing the resulting slurry to a rotating locus of centrifugal force; removing uncrystallized material from the upstream end of said locus; introducing wash liquid into the downstream end of said locus; removing a rich recycle stream from a point between the point of introduction of said wash liquid and the midpoint of said locus; introducing said recycle stream to said chiller; removing pure product from the downstream end of said locus; passing said uncrystallized material to an isomerization zone; and separating para-xylene from the effluent of said isomerization zone.

5. The process of producing para-xylene which comprises introducing a naphtha boiling in the range between 220° F. and 300° F. together with hydrogen in a hydrogen-hydrocarbon mol ratio of between 0.5–1 and 20–1 to contact with a reforming catalyst at a temperature within the range of between 700° F. and 1000° F., at a pressure of atmospheric to 1000 p. s. i. g., a liquid hourly spaced velocity of 0.3–10; separating a xylene concentrate from the effluent resulting from said contacting; cooling said xylene to a temperature of between —70° F. and —115° F. in a chiller; introducing the resulting slurry to a rotating locus of centrifugal force; removing uncrystallized material from the upstream end of said locus; introducing wash liquid into the downstream end of said locus; removing a rich recycle stream from a point between the point of introduction of said wash liquid and the midpoint of said locus; introducing said recycle stream to said chiller; removing pure product from the downstream end of said locus; passing said uncrystallized material to an isomerization zone; and separating para-xylene from the effluent of said isomerization zone.

6. A process of separating a mixture of materials having different melting points comprising cooling said mixture to form a slurry thereof; introducing said slurry to a rotating locus of centrifugal force; removing liquid material from the upstream end of said locus at a controlled rate; moving solid material toward the downstream end of said locus; removing purified material from the downstream end of said locus; introducing, to the downstream end of said locus only, a wash liquid comprising a portion of the solid material recovered from the downstream end of said locus following its melting; withdrawing at a controlled rate a rich recycle liquid stream from a point in said locus between the downstream end and the midpoint thereof; and returning this last-mentioned stream to said cooling step.

References Cited in the file of this patent
UNITED STATES PATENTS

| | | |
|---|---|---|
| 1,030,973 | Coppage | July 2, 1912 |
| 1,926,995 | Harkness | Sept. 12, 1933 |
| 2,283,457 | Pecker | May 19, 1942 |
| 2,496,253 | Purcell et al. | Jan. 31, 1950 |
| 2,541,682 | Arnold | Feb. 13, 1951 |
| 2,615,793 | Weedman | Oct. 28, 1952 |
| 2,636,909 | Oblad et al. | Apr. 28, 1953 |
| 2,683,178 | Findlay | July 6, 1954 |